US012586895B2

(12) United States Patent
Frydenlund

(10) Patent No.: US 12,586,895 B2
(45) Date of Patent: Mar. 24, 2026

(54) MOUNTING ARRANGEMENT FOR AN ANTENNA AND AN ANTENNA ARRANGEMENT

(71) Applicant: NTRAKKER AB, Bromma (SE)

(72) Inventor: Asbjörn Frydenlund, Stockholm (SE)

(73) Assignee: NTRAKKER AB, Bromma (SE)

( * ) Notice: Subject to any disclaimer, the term of this patent is extended or adjusted under 35 U.S.C. 154(b) by 143 days.

(21) Appl. No.: 18/025,000

(22) PCT Filed: Sep. 7, 2021

(86) PCT No.: PCT/SE2021/050856
§ 371 (c)(1),
(2) Date: Mar. 7, 2023

(87) PCT Pub. No.: WO2022/055407
PCT Pub. Date: Mar. 17, 2022

(65) Prior Publication Data
US 2023/0335892 A1 Oct. 19, 2023

(30) Foreign Application Priority Data
Sep. 9, 2020 (SE) .................................... 2030282-4

(51) Int. Cl.
*H01Q 1/42* (2006.01)
*H01Q 1/12* (2006.01)
*H01Q 1/34* (2006.01)
*H01Q 3/08* (2006.01)

(52) U.S. Cl.
CPC ............... *H01Q 1/42* (2013.01); *H01Q 1/125* (2013.01); *H01Q 1/34* (2013.01); *H01Q 3/08* (2013.01)

(58) Field of Classification Search
CPC ........... H01Q 1/42; H01Q 1/125; H01Q 1/34; H01Q 3/08; H01Q 1/32; H01Q 3/04; H01Q 1/12; H01Q 1/18
See application file for complete search history.

(56) References Cited

U.S. PATENT DOCUMENTS 5,359,337 A * 10/1994 Eguchi ..................... H01Q 1/18 342/359
6,933,908 B1 8/2005 Mirabueno
(Continued)

FOREIGN PATENT DOCUMENTS

JP H10-126286 A 5/1998
WO 2010/076336 A1 7/2010
WO 2011/162614 A1 12/2011

*Primary Examiner* — Dimary S Lopez Cruz
*Assistant Examiner* — Anna N Hamadyk
(74) *Attorney, Agent, or Firm* — Shore IP Group, PLLC; Sean R. Wilsusen

(57) ABSTRACT

The invention relates to a mounting arrangement (10; 20) for an antenna (11), comprising a radome (12), a first bearing (13) arranged in a top portion of the radome (12), a second bearing (14) arranged in a bottom portion of the radome (12), and a rotatable mounting frame (15; 25) having an upper portion (16), which is rotatable engaged with the first bearing (13), and a lower portion (17), which is rotatable engaged with the second bearing (14), and the rotatable mounting frame (15; 25) being configured for attachment of at least one antenna (11), wherein the radome (12) is a dome-shaped radome (12).

16 Claims, 2 Drawing Sheets

(56) References Cited

U.S. PATENT DOCUMENTS

| | | | | |
|---|---|---|---|---|
| 7,427,962 | B2 * | 9/2008 | Yang ...................... | H01Q 1/246<br>343/757 |
| 9,160,441 | B2 | 10/2015 | Norin et al. | |
| 9,994,152 | B1 | 6/2018 | Hess | |
| 10,135,519 | B1 * | 11/2018 | Tian ...................... | H01Q 1/125 |
| 2006/0138276 | A1 | 6/2006 | Tibi et al. | |
| 2006/0192715 | A1 * | 8/2006 | Kim ...................... | H01Q 1/246<br>343/766 |
| 2013/0288593 | A1 | 10/2013 | Norin et al. | |
| 2015/0295306 | A1 * | 10/2015 | Starke ...................... | H01Q 1/42<br>343/872 |

* cited by examiner

MOUNTING ARRANGEMENT FOR AN ANTENNA AND AN ANTENNA ARRANGEMENT

TECHNICAL FIELD

The present invention relates generally to a mounting arrangement for an antenna, which mounting arrangement comprises a rotatable axle being rotatable arranged inside a dome-shaped radome. The invention further relates to an antenna arrangement comprising such a mounting arrangement.

BACKGROUND

It is well-known to arrange a radar antenna inside a radome, which is a weatherproof enclosure that protects that radar antenna and which is constructed of a material that minimally attenuates the electromagnetic signal transmitted or received by the radar antenna. Typically, such a radome is not a structural part of a mounting arrangement for the radar antenna. For an antenna, which is designed for tracking of satellites, the corresponding mounting arrangement is usually a rather sophisticated gyro-based arrangement, which is a necessary requirement since the tracking antenna must be able to accurately receive signals from multiple satellites which are moving in three dimensions. The tracking antenna must, for example, be able to track a satellite which at some point in time is located more or less vertically above the signal-receiving tracking antenna.

Other antenna arrangements are also known. For example, the U.S. Pat. No. 9,160,441 to Norin et al. discloses a wireless network antenna comprising a closed cylinder, in which an antenna assembly is rotatable mounted such that a motor can mechanically rotate the antenna about a central axis of the closed cylinder.

The known antenna arrangements may work very well for their intended purposes, but they are generally rather complex and expensive, and are—at least for some—applications also not strong and robust enough. An object of the present invention is therefore to provide an improved mounting arrangement for an antenna, which mounting arrangement provides a stronger and more robust mounting of an antenna. Another object of the invention is to provide an antenna arrangement comprising such a mounting arrangement.

SUMMARY OF THE INVENTION

The above-mentioned objects are achieved with a mounting arrangement for an antenna and to an antenna arrangement according to the independent claims. Preferred embodiments are set forth in the dependent claims.

In a first aspect, the present invention relates to a mounting arrangement for an antenna, comprising a radome, a first bearing arranged in a top portion of the radome, a second bearing arranged in a bottom portion of the radome, and a rotatable mounting frame, which is configured for attachment of at least one antenna, wherein the rotatable mounting frame has an upper portion, which is rotatable engaged with the first bearing, and a lower portion, which is rotatable engaged with the second bearing, and wherein the radome is a dome-shaped radome.

By providing a mounting arrangement for an antenna wherein a rotatable mounting frame is rotatable engaged in and extends between a top portion and a bottom portion of a dome-shaped radome, there is provided a particular strong, robust and sturdy mounting arrangement, which takes advantage of the inherent strength and structural integrity provided by a dome-shaped, e.g. spherical or semi-spherical, radome.

In a first embodiment, the mounting frame comprises a rotatable axle, and when an antenna is attached to the rotatable axle, it can rotate in a horizontal plane, which is a situation that is applicable when the signal-receiving antenna is located on a boat and is configured for finding and tracking senders located on land, i.e. at or close to the coast line. In this case, there is often no need for the receiving antenna to be moveable in a vertical direction.

In a second embodiment of a mounting arrangement for an antenna according to the invention, a rotatable mounting frame comprises two frame members, such that the rotatable mounting frame comprises a first outwardly curved frame member, which extends between an upper portion and a lower portion of the rotatable mounting frame, and a second outwardly curved frame member, which extends between the upper and lower portions and which is arranged opposite the first frame member, such that a free space is provided between the first and second frame members, and the first and second frame members being configured for attachment of at least one antenna. In an embodiment, the mounting arrangement comprises a second rotatable mounting frame, whose ends are attached in a third bearing and a fourth bearing arranged on the first and second frame members, respectively. By this arrangement the second rotatable mounting frame and thereby said antenna are tiltable, i.e. they can move and/or rotate in a vertical plane.

By arranging the first frame member and the second frame member opposite to each other, with their curvatures directed outwards in opposite directions, a free, rounded space is provided between the first and second frame members; and by providing an attachment that allows tilting, i.e. movement in a vertical direction, the antenna can be moved in both a horizontal plane and a vertical plane, which provides for a very versatile antenna mounting arrangement. However, also in this case, the inherent strength and structural integrity of a spherical or semi-spherical radome is utilized in combination with rotatable mounting frame.

In a second aspect, the invention provides an antenna arrangement comprising a mounting arrangement, as described above and as will be further described below, and at least antenna mounted in such a mounting arrangement.

BRIEF DESCRIPTION OF THE DRAWINGS

The present invention will be further explained hereinafter by means of non-limiting examples and with reference to the appended drawings, wherein.

DETAILED DESCRIPTION OF PREFERRED EMBODIMENTS

Figure 1A:
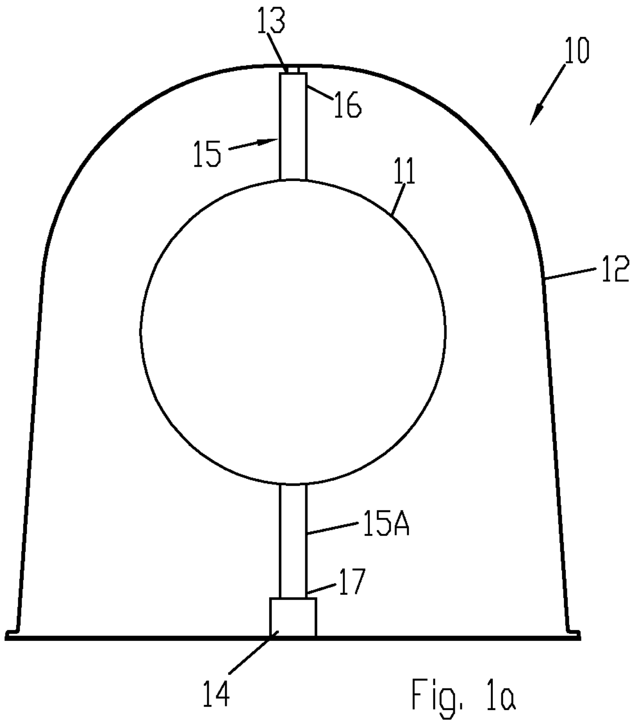
FIGS. 1a and 1b illustrate schematically a front view and a sideview, respectively, of an antenna and a mounting arrangement according to a first embodiment of the present invention.

In the figures, same, similar or corresponding elements have been given the same reference numerals.

Figure 1B:
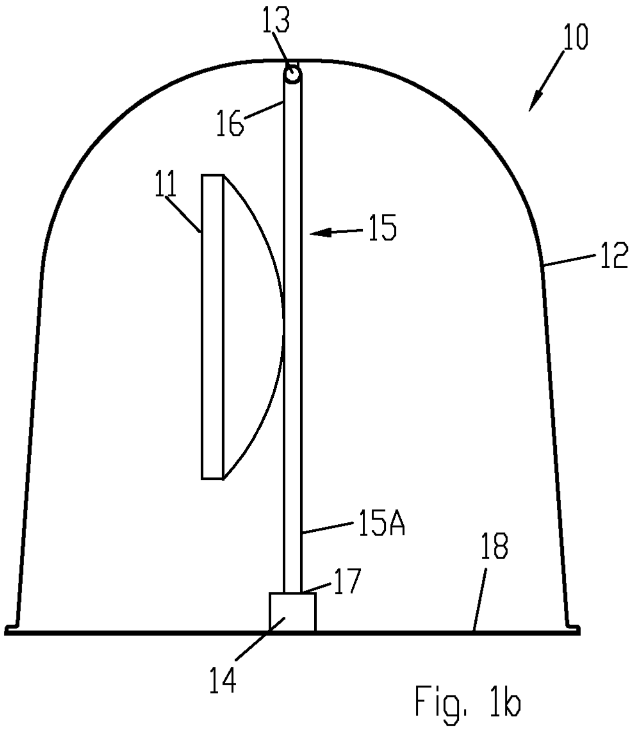

FIG. 1a illustrates schematically a front view and FIG. 1b illustrates schematically a sideview of a mounting arrangement 10 for an antenna 11 according to a first embodiment of the present invention. The mounting arrangement 10 comprises a radome 12, a first bearing 13 arranged in a top portion of the radome 12, a second bearing 14 arranged in a bottom portion of the radome 12, a mounting frame 15, which comprises an upper portion 16, which is rotatable connected to the first bearing 13, and a lower portion 17, which is rotatable connected to the second bearing 14, such that a rotatable mounting frame 15 is provided. In the embodiment shown in FIGS. 1*a* and 1*b*, the rotatable mounting frame 15 is provided as rotatable axle 15A. As is depicted in FIG. 1*b*, such a rotatable axle 15A can comprise a curvature or bend, which provides more space for an antenna, such as antenna 11, since the antenna then can be located in the center of the radome 12 rather than be located towards a wall of the radome 12. According to the invention the radome 12 is a dome-shaped radome 12, which herein means that the radome 12 comprises at least an essentially hemi-spherical upper portion. A lower portion of the radome 12 can according to the invention be cylindrical but is preferably shaped as a truncated cone with a narrowing, preferably continuously narrowing, diameter towards the adjoining upper portion, as is illustrated in FIGS. 1*a* and 1*b*. For easy attachment to another object, such as boat or other vehicle, the lower portion of the radome 12 comprises a flat bottom plate 18.

By arranging a mounting frame within a radome, which is dome-shaped, i.e. comprises at least a hemi-spherical upper portion, the mounting arrangement that is achieved utilizes the inherent strength of a spherical object, and a sturdy, strong and robust mounting arrangement is achieved. Further, a mounting arrangement according to the first embodiment of the present invention does not (or does at least not in an obvious way) provides for an antenna arrangement that allows vertical movement of the antenna. The mounting arrangement illustrated and described in conjunction with FIGS. 1*a* and 1*b* is, however, intended for situations in which the antenna is mounted on a vehicle that receives signals from senders that are in approximate level with vehicle in question. A typical example would be when the vehicle is marine vessel and the sender is land-based and located at or near the coast.

Figure 2A:
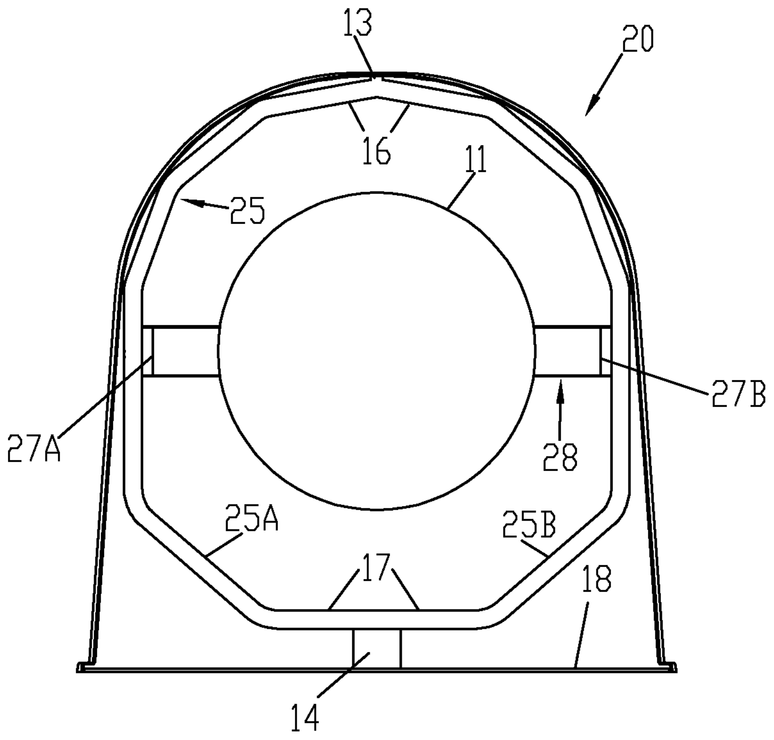
FIGS. 2a and 2b illustrate schematically a front view and a sideview, respectively, of an antenna and a mounting arrangement according to a second embodiment of the present invention.
Figure 2B:
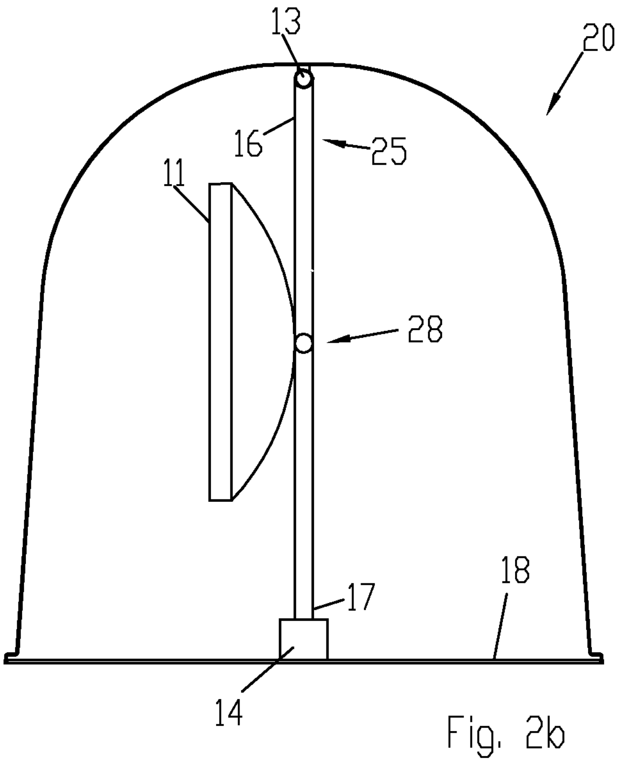

FIG. 2*a* illustrates schematically a front view and FIG. 2*b* illustrates schematically a sideview of a mounting arrangement 20 for an antenna 11 according to a second embodiment of the present invention. The mounting arrangement 20 comprises a radome 12, a first bearing 13 arranged in a top portion of the radome 12, a second bearing 14 arranged in a bottom portion of the radome 12, a mounting frame 25, which comprises an upper portion 16, which is rotatable connected to the first bearing 13, and a lower portion 17, which is rotatable connected to the second bearing 14, such that a rotatable mounting frame 25 is provided. In the embodiment shown in FIGS. 2*a* and 2*b*, the rotatable mounting frame 25 comprises a first outwardly curved frame member 25A, which extends between the upper portion 16 and the lower portion 17, and a second outwardly curved frame member 25B, which extends between the upper portion 16 and the lower portion 17. The first frame member 25A and the second frame member 25B are arranged opposite to each other, with their curvatures directed in opposite directions, such that a free space is provided between the first and second frame members 25A, 25B, as can be seen in FIG. 2*a*. The antenna 11 is attached to the first and second frame members 25A, 25B, and is preferably tiltable, i.e. rotatable, attached to the first and second frame members 25A, 25B, such that the antenna 11 can be rotated in a vertical plane. The latter is achieved by providing a third bearing 27A on the first frame member 25A and a fourth bearing 27B on the second frame member 25B and arranging a second rotatable frame 28 in rotatable engagement with the third bearing 27A and the fourth bearing 27B. The second rotatable frame member 28 can be arranged as an axle, which extends between the third and fourth bearings 27A, 27B, or can be arranged as two frame members, where a first frame member extends between the antenna 11 and the third bearing 27A and the second frame member extends between the antenna 11 and the fourth bearing 27B. Further, as is depicted in FIG. 2*b*, the first and second frame members 25A, 25B can comprise a second curvature or bend, which provides more space for an antenna, such as antenna 11, since the antenna then can be located in the center of the radome 12 rather than be located towards a wall of the radome 12. According to the invention the radome 12 is a dome-shaped radome 12, which herein means that the radome 12 comprises at least an essentially hemi-spherical upper portion. A lower portion of the radome 12 can according to the invention be cylindrical but is preferably shaped as a truncated cone with a narrowing, preferably continuously narrowing, diameter towards the adjoining upper portion, as is illustrated in FIGS. 2*a* and 2*b*. For easy attachment to another object, such as boat or other vehicle, the lower portion of the radome 12 comprises a flat bottom plate 18.

By arranging a mounting frame within a radome, which is dome-shaped, i.e. comprises at least a hemi-spherical upper portion, the mounting arrangement that is achieved utilizes the inherent strength of a spherical object, and a sturdy, strong and robust mounting arrangement is achieved. Further, a mounting arrangement according to the second embodiment of the present invention does provide for an antenna arrangement that allows rotational movement of the antenna in a vertical plane, i.e. the antenna can rotate both in a horizontal plane and in a vertical plane, which provides for a versatile antenna mounting arrangement.

An antenna arrangement according to the invention comprises a mounting arrangement as described above and an antenna, such as antenna 11. In practice, such an antenna arrangement would further comprise other elements such as at least one motor, a control unit and electronic circuitry. However, these components and the arrangements thereof are well known to the skilled person and are consequently not described herein.

The first bearing 13 and the second bearing 14 can be any kind of bearings that allow for rotatable arrangement of an object whose ends are arranged therein. Examples of such a bearing, which also can be referred to as a rotary bearing, would be ball bearings or slide bearings.

Although the present invention has been described with reference to specific embodiments, also shown in the appended drawings, it will be apparent to those skilled in the art that many variations and modifications can be done within the scope of the invention as described in the specification and defined with reference to the claims below.

The invention claimed is:

1. A mounting arrangement for an antenna, comprising:
- a radome;
- a first bearing arranged in a top portion of the radome;
- a second bearing arranged in a bottom portion of the radome; and
- a rotatable mounting frame extending from the top portion of the radome to the bottom portion of the radome, which is configured for attachment of at least one antenna, wherein the rotatable mounting frame has an upper portion, which is rotatably engaged with the first bearing, a lower portion, which is rotatably engaged with the second bearing, the radome is a dome-shaped radome, the first and second bearings are non-movably attached to the radome and configured to allow only rotational movement of the mounting frame with respect to the radome, and the first bearing is directly connected to a topmost surface of the radome, the second bearing is directly connected to a bottommost surface of the radome, and the rotatable mounting frame is directly connected to each of the first bearing and the second bearing and extends continuously between the first bearing and the second bearing.

2. The mounting arrangement for an antenna according to claim 1, wherein the rotatable mounting frame comprises a rotatable axle.

3. The mounting arrangement for an antenna according to claim 1, wherein the rotatable mounting frame comprises:

a first outwardly curved frame member, which extends between the upper portion and the lower portion; and a second outwardly curved frame member, which extends between the upper portion and the lower portion and which is arranged opposite the first frame member, such that a free space is provided between the first and second frame members, and the first and second frame members being configured for attachment of at least one antenna.

4. The mounting arrangement according to claim 3, wherein the first and second frame members are configured for tiltable attachment of at least one antenna.

5. An antenna arrangement comprising a mounting arrangement according to claim 1 and at least one antenna, wherein said at least one antenna is attached to the rotatable mounting frame.

6. An antenna arrangement comprising a mounting arrangement according to claim 4 and at least one antenna, wherein said at least one antenna is attached to the first and second frame members.

7. An antenna arrangement comprising a mounting arrangement according to claim 3 and at least one antenna, wherein said at least one antenna is attached to the first and second frame members.

8. An antenna arrangement comprising a mounting arrangement according to claim 2 and at least one antenna, wherein said at least one antenna is attached to the rotatable mounting frame.

9. The mounting arrangement according to claim 1, wherein the radome comprises an essentially hemispherical upper portion and a lower portion shaped as a truncated cone narrowing towards the adjoining upper portion.

10. The mounting arrangement according to claim 1, wherein the radome is parabolically-shaped with an apex at the top portion thereof.

11. The mounting arrangement according to claim 1, wherein the rotatable mounting frame is multifaceted.

12. The mounting arrangement according to claim 11, wherein said mounting frame is a first rotatable mounting frame, and additionally comprising a second rotatable frame mounted on the first rotatable mounting frame at third and fourth bearings and extending as an axle therebetween.

13. The mounting arrangement according to claim 12, wherein an antenna is mounted upon the second rotatable frame to rotate therewith.

14. The mounting arrangement according to claim 1, wherein the lower portion of the radome comprises a flat bottom plate.

15. The mounting arrangement according to claim 1, wherein the rotatable mounting frame extends entirely between the top portion of the radome and the bottom portion of the radome.

16. The mounting arrangement according to claim 1, wherein the rotatable mounting frame extends from the top portion of the radome, past a midpoint of the radome, and to the bottom portion of the radome.

* * * * *